(12) United States Patent
Kitchener et al.

(10) Patent No.: US 11,761,586 B1
(45) Date of Patent: Sep. 19, 2023

(54) HYDROGEN GAS COMPRESSION SYSTEM

(71) Applicant: KDR Patents Pty Ltd, Spotswood (AU)

(72) Inventors: Anthony John Kitchener, Spotswood (AU); Gerard Daniel Kitchener, Spotswood (AU)

(73) Assignee: KDR PATENTS PTY LTD, Spotswood (AU)

( * ) Notice: Subject to any disclaimer, the term of this patent is extended or adjusted under 35 U.S.C. 154(b) by 0 days.

(21) Appl. No.: 18/076,125

(22) Filed: Dec. 6, 2022

(30) Foreign Application Priority Data

Sep. 1, 2022 (AU) ................................ 2022902515

(51) Int. Cl.
*B01D 53/02* (2006.01)
*F17C 5/06* (2006.01)
*B01D 53/26* (2006.01)

(52) U.S. Cl.
CPC .............. *F17C 5/06* (2013.01); *B01D 53/261* (2013.01); *B01D 2257/104* (2013.01); *B01D 2257/80* (2013.01); *F17C 2221/012* (2013.01); *F17C 2223/0123* (2013.01); *F17C 2225/0123* (2013.01); *F17C 2227/0164* (2013.01); *F17C 2250/0657* (2013.01)

(58) Field of Classification Search
CPC .................. F17C 5/06; F17C 2221/012; F17C 2223/0123; F17C 2225/0123; F17C 2227/0164; F17C 2250/0657; B01D 53/261; B01D 2257/104; B01D 2257/80
See application file for complete search history.

(56) References Cited

U.S. PATENT DOCUMENTS

| | | | | |
|---|---|---|---|---|
| 5,169,295 A | * | 12/1992 | Stogner .................... | F17C 5/06 417/339 |
| 10,001,030 B2 | * | 6/2018 | Krish ........................ | F02C 7/06 |
| 2002/0127442 A1 | * | 9/2002 | Connor .............. | B01D 53/0476 429/408 |
| 2006/0055175 A1 | * | 3/2006 | Grinblat .................. | F03B 13/26 290/54 |
| 2008/0095652 A1 | * | 4/2008 | Jiang ........................ | F01C 1/322 418/48 |
| 2011/0015456 A1 | * | 1/2011 | Broadbent ................ | C10L 3/10 95/203 |
| 2012/0037488 A1 | * | 2/2012 | Zebuhr .................. | B01D 1/227 202/185.1 |
| 2022/0290309 A1 | * | 9/2022 | Wehrman .................. | C25B 9/70 |

* cited by examiner

*Primary Examiner* — Christopher P Jones
(74) *Attorney, Agent, or Firm* — LEMPIA SUMMERFIELD KATZ LLC

(57) ABSTRACT

A system for compressing hydrogen gas may include a compression stage with a water lubricated and sealed compressor, a gas-liquid separation stage, and a drying stage with an adsorption-type gas dryer. The system receives hydrogen gas via an inlet and discharges dry compressed hydrogen gas via an outlet. The system has an encapsulating vessel defining a cavity within which the separation stage and drying stage are located.

20 Claims, 10 Drawing Sheets

HYDROGEN GAS COMPRESSION SYSTEM

CROSS-REFERENCE TO RELATED APPLICATIONS

This application is based on and claims priority under 35 U.S.C. § 119 to Australian Provisional Patent Application No. 2022902515, filed on Sep. 1, 2022 with IP Australia, the disclosure of which is incorporated herein by reference.

FIELD OF THE DISCLOSURE

The present disclosure relates to a hydrogen gas compression system.

BACKGROUND

Hydrogen gas is considered to be beneficial as a fuel from which to transform energy for electrical and mechanical energy needs, when compared with other fuel sources. The reasons for this include the environmental benefits that can be achieved at the point of extracting the stored energy from the hydrogen gas (particularly carbon-free reaction products), the high energy efficiency potential of certain types of energy conversion systems, and the abundance of hydrogen in the environment and the capacity to extract hydrogen from water using renewable energy and biomass processes.

There is a current focus on development of hydrogen fuel cells for both in stationary and portable uses (i.e., to power an electrified powertrain in vehicles).

For commercial viability, it is necessary for hydrogen gas to be highly compressed. Currently available pure hydrogen energy conversion systems store hydrogen, in its gaseous state, at pressures in excess of 2 MPa (20 bar). Most applications that utilise compressed hydrogen gas operate with the gas at pressures in excess of 2 Mpa (20 bar). As an example, in August 2021, the second-generation Toyota Mirai was configured to store hydrogen gas at 70 Mpa (700 bar).

In most applications, it is desirable, if not necessary, that the compressed hydrogen is free of contaminants, including oil, water, and oxygen. Depending on the end use of the compressed hydrogen, the presence of contaminants can cause damage to equipment, and/or introduce quality or efficiency problems. By way of example, a hydrogen fuel cell can be permanently destroyed by the contaminants in the hydrogen fuel.

Typically, compression of hydrogen gas to such high pressures is done by high-pressure, low-volume oil-free reciprocating compressors. The drawbacks of this type of compressor include the size to achieve appropriate compressor capacity, the maintenance of the seals, and the associated costs. It is also known to use diaphragm compressors, but these are larger and more expensive due to the even lower working compressor capacity.

There is a need to address the above, and/or at least provide a useful alternative.

SUMMARY

According to an embodiment of the present disclosure, there is provided a hydrogen gas compression system. The hydrogen gas compression system includes a primary gas inlet through which to receive hydrogen gas, a compression stage, a separation stage, a drying stage, and a primary gas outlet. The compression stage includes an intake that receives gas from the primary gas inlet, at least one rotary compressor, and a compression stage discharge. The at least one rotary compressor includes: a working chamber; one or more rotating elements housed internally of the working chamber that are driven via an input shaft to compress gas passing through the working chamber; and a liquid water inlet through which liquid water is delivered into the working chamber to provide lubrication to the rotating elements, and sealing of the working chamber. The compression stage discharge is in communication with the working chamber, through which a fluid stream containing at least compressed hydrogen gas and water is discharged. The separation stage is in communication with the compression stage discharge and includes at least one separator that is configured to separate a liquid component, such as liquid water, from the fluid stream and thereby discharge a gas stream. The drying stage is in communication with the separation stage and includes at least one adsorption-type gas dryer that is configured to adsorb and thereby remove water vapour from the gas stream. The primary gas outlet is in communication with the drying stage, and through which dry compressed hydrogen gas is discharged.

In at least some embodiments, the system may further include an encapsulating vessel defining a cavity within which the separation stage and drying stage are located. The encapsulating vessel may have a port in communication with the primary gas outlet. In one embodiment, at least the compression stage discharge of the compression stage is located within the cavity.

The encapsulating vessel can be substantially hermetically sealed so that the cavity is isolated from the atmosphere.

In one embodiment, the at least one rotary compressor includes a housing, and the vessel is configured to mate with the housing, and the cavity is defined by the housing and the vessel.

Alternatively or additionally, the vessel can include a removable lid.

The encapsulating vessel can be configured to form a sump within which to collect the liquid component separated from the fluid stream in the separation stage.

In one embodiment, the system includes a water return circuit that receives liquid water collected in the sump, and supplies liquid water to the liquid water inlet of the compression stage. In some embodiments, the water return circuit includes a heat exchanger to reduce the temperature of water passing through the water return circuit.

The system can further include an overflow valve to limit the quantity of liquid water within the sump to a predetermined volume.

Each of the one or more rotating elements of the rotary compressor can be any of: a vane, a screw, a complementary twin screw pair, a scroll, or combinations thereof.

In some examples, the compression stage can have two or more rotary compressors that are assembled for sequential compression of hydrogen gas.

The system can further include a drive motor having an output shaft, and a non-contact coupling mounted between the drive motor output shaft and the input shaft. In at least some examples, the non-contact coupling is a magnetic coupling.

In embodiments in which the heat exchanger is arranged to exchange heat to ambient air, the system can further include a fan to force air through the heat exchanger. In one embodiment, the fan is mounted on a secondary output shaft of the drive motor.

In some examples, the gas dryer contains desiccant material to adsorb water vapour from the gas stream. In one embodiment, the gas dryer is a regenerative desiccant gas dryer.

In at least some embodiments, the gas dryer is in the form of a pressure swing adsorption unit that has dual chambers each containing a bed of desiccant material, and valves to control the flow of the gas stream through the chambers such that in operation of the system each chamber alternately adsorbs water vapour from the gas stream into the desiccant material, and regenerates the desiccant material.

In at least one embodiment, each of the chambers is a generally elongate chamber. In this case, the system is arranged with the longitudinal axes of the chambers being substantially parallel with the rotational axis of the input shaft. In some embodiments, the system is arranged with the longitudinal axes of the chambers being horizontal.

In one embodiment, the gas dryer is configured to regenerate the desiccant material by diverting a portion of the dry compressed hydrogen gas that is discharged from the drying stage to form a purge gas stream. The purge gas stream may be expanded to be approximately at the pressure at the intake, and then passed through the desiccant material to be regenerated. In at least some embodiments, the system is arranged to return the purge gas stream to the intake of the compression stage after passing through the desiccant material to be regenerated.

In certain embodiments, the valves are operated by a pressurized gas control subsystem. In one embodiment, the control gas is hydrogen gas. In some alternatives, the gas control subsystem utilizes a control gas that is substantially inert with respect to hydrogen gas.

In some embodiments, the, or each separator has a liquid discharge through which a liquid component of the fluid stream is discharged for accumulation in the sump.

In at least one embodiment, the separation stage includes a first separator that removes a first portion of liquid water from the fluid stream, and a second separator that removes a second portion of liquid water from the fluid stream. The first portion of liquid water may be in a form having a droplet size that is larger than the droplet of the second portion of liquid water.

In one embodiment, the second portion of liquid water consists substantially of aerosols.

The separation stage can include a centrifugal-type separator that induces a vortex in the incoming fluid stream, where centrifugal force within the vortex at least substantially separates at least a first portion of liquid water out of the fluid stream.

The separation stage can alternatively or additionally include a coalescing-type separator with at least one screen element through which to pass the fluid stream, whereby liquid water within the fluid stream coalesces on the surface of the screen element to thereby separate the fluid stream into coalesced liquid water and the gas stream. The coalesced liquid water forms a part of the liquid component that is separated from the fluid stream.

In some embodiments, the separation stage includes a dual action separator that provides for sequential centrifugal separation and coalescing separation of the fluid stream. The centrifugal separation removes a first portion of liquid water from the fluid stream and the coalescing separation removes a second portion of liquid water from the fluid stream, such that the gas stream includes a hydrogen gas fraction and a water vapour fraction.

The system can further include a pressure boost stage that acts on one of the gas stream or the fluid stream. The pressure boost stage may include a gas driven pressure booster that is configured to increase the pressure of the gas stream or the fluid stream passing therethrough.

In some embodiments, a portion of the gas stream or the fluid stream is used as a drive gas for the gas driven pressure booster. In one embodiment, the system is configured to direct exhausted drive gas to a lower pressure point within the system between the primary gas inlet and the pressure boost stage.

In certain examples, the gas driven pressure booster is a single stage booster. In some more particular examples, the gas driven pressure booster is a dual action single stage booster.

In one example, the maximum compression ratio of the gas driven pressure booster is at least 2:1. In another example, the maximum compression ratio of the gas driven pressure booster is at least 2.5:1.

In some examples, the system further includes a deoxidation stage that is arranged to remove oxygen from the fluid stream. In examples in which the separation stage provides sequential centrifugal separation and coalescing separation, the deoxidation stage receives the fluid stream after centrifugal separation, and prior to coalescing separation.

The deoxidation stage can include a deoxidation vessel having a chamber, and a catalyst within the chamber, the catalyst being selected to remove oxygen molecules from the fluid stream.

The system can further include conduits that interconnect the deoxidation stage with other components of the system, the conduits passing through the wall of the encapsulating vessel such that the deoxidation processes occur substantially external to the cavity.

According to an embodiment of the present disclosure, there is provided a hydrogen gas production facility. The hydrogen gas production facility includes an electrolyser for electrolysing hydrogen gas from water and a system for compressing the hydrogen gas obtained from the electrolyser as previously described.

In embodiments in which the system includes an overflow valve to limit the quantity of water within the sump to a predetermined volume, water discharged via the overflow valve can be directed to the inlet side of the electrolyser.

According to an embodiment of the present disclosure, there is also provided a method of compressing hydrogen gas. The method of compressing hydrogen gas includes: receiving hydrogen gas; compressing the received hydrogen gas in a water-flooded rotary compressor, thereby discharging a fluid stream containing compressed hydrogen gas and water; separating the fluid stream into a gas stream and a liquid water component; and removing water vapour from the gas stream to thereby form dry compressed hydrogen gas.

BRIEF DESCRIPTION OF THE DRAWINGS

In order that the disclosure may be more easily understood, embodiments will now be described, by way of example only, with reference to the accompanying drawings, in which.

DETAILED DESCRIPTION

Figure 1:
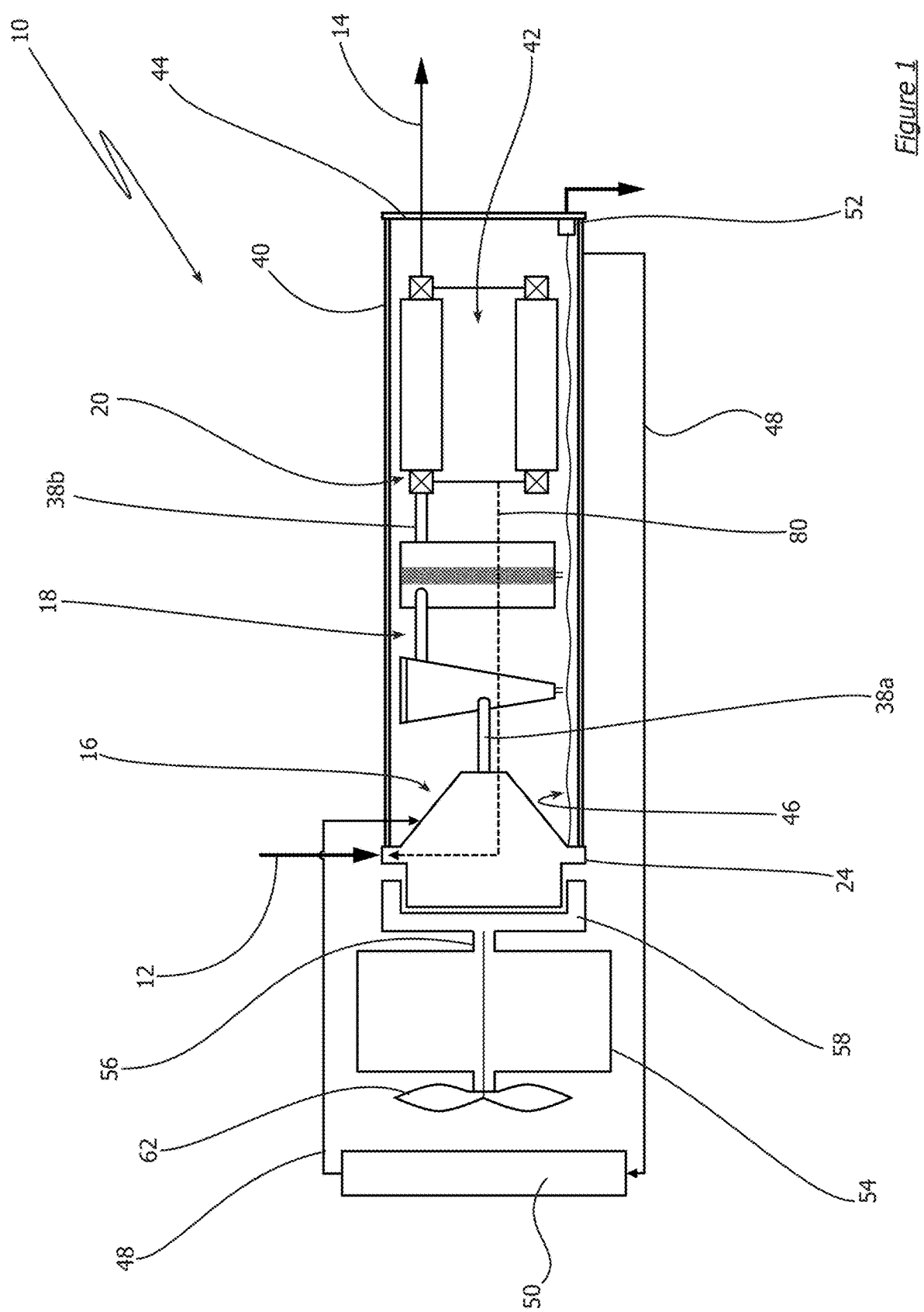
FIG. 1: is a piping and instrumentation diagram of a system for compressing hydrogen gas according to an embodiment.

FIGS. 1 to 4 illustrate schematically a piping and instrumentation diagram of a system 10 for compressing hydrogen gas. The system 10 has a primary gas inlet 12 through which to receive hydrogen gas, and a primary gas outlet 14 through which dry compressed hydrogen gas is to be discharged.

In this particular example, the system 10 includes a compression stage 16, a separation stage 18, and a drying stage 20.

Figure 2:
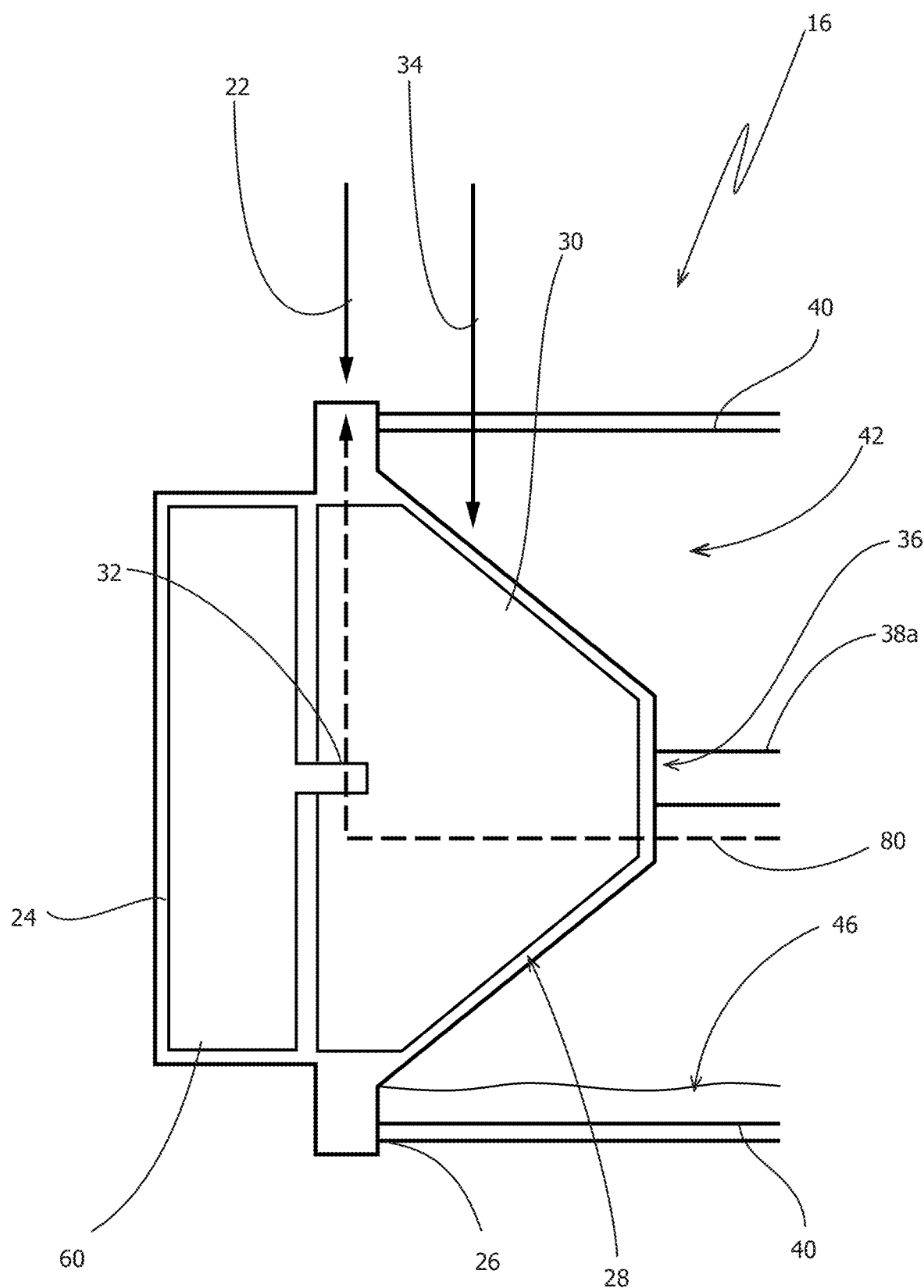
FIG. 2: is a schematic diagram of the compression stage of the system of FIG. 1.

The compression stage 16, which is illustrated schematically in FIG. 2, has an intake 22 that receives gas from the primary gas inlet 12, and a rotary compressor 24. The rotary compressor 24 has a housing 26 that defines a working chamber 28, and has a rotating element 30 that is housed internally of the working chamber 28. The rotating element 30 is driven via an input shaft 32 to compress gas passing through working chamber 28.

Liquid water is delivered into the working chamber 28 via a liquid water inlet 34 (which is shown schematically in FIG. 2). Within the working chamber 28, the liquid water provides lubrication to the rotating element 30, and sealing of the working chamber 28. The rotary compressor 24 is a water-flooded gas compressor, which is a known component and an example of which is described in U.S. Pat. No. 4,758,138. As should be appreciated by those having ordinary skill in the art, the gas compression by the rotary compressor 24 increases the temperature of the gas within the working chamber 28. Water within the working chamber 28 is at least partially vapourised, with the change of phase providing cooling to the rotary compressor 24. In use of the system 10, a fluid stream containing at least compressed hydrogen gas and water is discharged via the compression stage discharge 36.

A compression stage discharge 36 is in communication with the working chamber 28. The fluid stream is discharged via the compression stage discharge 36 into a pipe 38a that interconnects the compression stage 16 with the separation stage 18.

The separation stage 18 includes at least one separator (discussed in further detail below) that is configured to separate liquid water from the fluid stream and thereby discharge a gas stream. A pipe 38b interconnects the separation stage 18 with the drying stage 20. The drying stage 20 includes at least one adsorption-type gas dryer (also discussed in further detail below) that is configured to adsorb and thereby remove water vapour from the gas stream.

The primary gas outlet 14 is in communication with the drying stage 20. Thus, in use of the system 10, dry compressed hydrogen gas is discharged at the primary gas outlet 14.

The system 10 illustrated in FIG. 1 has the benefit of enabling the use of a rotary compressor 24 that is operated at high speed and is thus configured to attain high compression ratios with sufficient capacity. The liquid water inlet 34 directing liquid water into the working chamber 28 ensures that the operating temperature of the rotary compressor 24 can be kept low.

The inclusion of the separation stage 18 and drying stage 20 within the system 10 removes the liquid water, and then the water vapour, from the fluid stream that is discharged from the rotary compressor 24. Thus, the system 10 is able to provide hydrogen gas compressed to pressures in excess of 2 MPa (20 bar), and free of contaminant water.

The system 10 includes an encapsulating vessel 40 with a cavity 42 to contain the separation stage 18 and drying stage 20. The encapsulating vessel 40 is hermetically sealed so that the cavity 42 is isolated from the surrounding atmosphere. In this particular example, the encapsulating vessel 40 mates with the housing 26 of the rotary compressor 24, such that the compression stage discharge 36 is located within the cavity 42. The encapsulating vessel 40 includes a removable lid 44 that closes an access opening in the vessel 40. In the illustrated embodiment, the lid 44 has the form of a cover plate. In some alternative embodiments, the removable lid 44 can be a domed cap or head.

The bottom part of the cavity 42 within the encapsulating vessel 40 defines a sump 46 to collect liquid water that is removed from the fluid stream in the separation stage 18. Collected liquid water is illustrated within the sump 46 of the cavity 42.

In use of the system 10, the head space of the cavity 42 is to be filled with hydrogen gas. This provides benefit in that propagation of gas into either the fluid stream or the gas stream from the cavity does not introduce contaminating material. Further, in use of the system 10, the head space of the cavity 42 is to be pressurized to a level that is approximately equal to the pressure of the dried compressed hydrogen gas at the primary gas outlet 14.

The system 10 includes a water return circuit 48 that receives liquid water collected in the sump 46, and supplies that collected water to the liquid water inlet 34. In this way, the collected liquid water is reused by the rotary compressor 24. The water return circuit 48 can include a heat exchanger 50 to reduce the temperature of the water that is returned to the liquid water inlet 34.

An overflow valve 52 is provided to the encapsulating vessel 40 to limit the quantity of liquid water within the sump 46 to a predetermined volume. In some examples, the overflow valve 52 can be mechanically actuated, such as a float valve. In some alternative examples, the overflow valve 52 can include a sensor that communicates with a pump to actively draw liquid water out from the sump 46.

It should be appreciated that FIG. 2 illustrates the rotating element 30 schematically. The rotating element 30 can be a vane, screw, or scroll. It will also be appreciated that certain compressor types have multiple rotating elements, such as complementary twin screw pairs. Further, the compression stage 16 can have multiple working chambers and rotating elements, or multiple compressors that are assembled within the system for sequential compression. In this way, compression of hydrogen gas within the compression stage 16 can be performed in multiple stages.

The system 10 includes a drive motor 54 having an output shaft 56. A non-contact coupling is mounted between the output shaft 56 and the input shaft 32 of the rotary compressor 24. In this example, the non-contact coupling is in the form of a magnetic coupling with a driving rotor 58 mounted on the output shaft 56, and a driven rotor 60 mounted on the input shaft 32. The coupling enables contactless torque transmission between the drive motor 54 and the rotary compressor 24. In addition, part of the housing 26 forms a containment shroud between the rotors 58, 60 of the coupling.

The use of the non-contact coupling has the benefit of eliminating an opening in the housing of the rotary compressor for a shaft to transfer rotational motion from the drive motor to the rotating element. Hence, the need for a stuffing box in the housing is also eliminated.

The drive motor 54 has a cooling fan 62 that is also mounted on the output shaft 56. The cooling fan 62 is on the opposing side of the motor housing to the driving rotor 58. The cooling fan 62 and heat exchanger 50 are arranged such that rotation of the cooling fan 62 pushes air through the heat exchanger 50 to increase the heat transfer rate of the heat exchanger 50.

Figure 3:
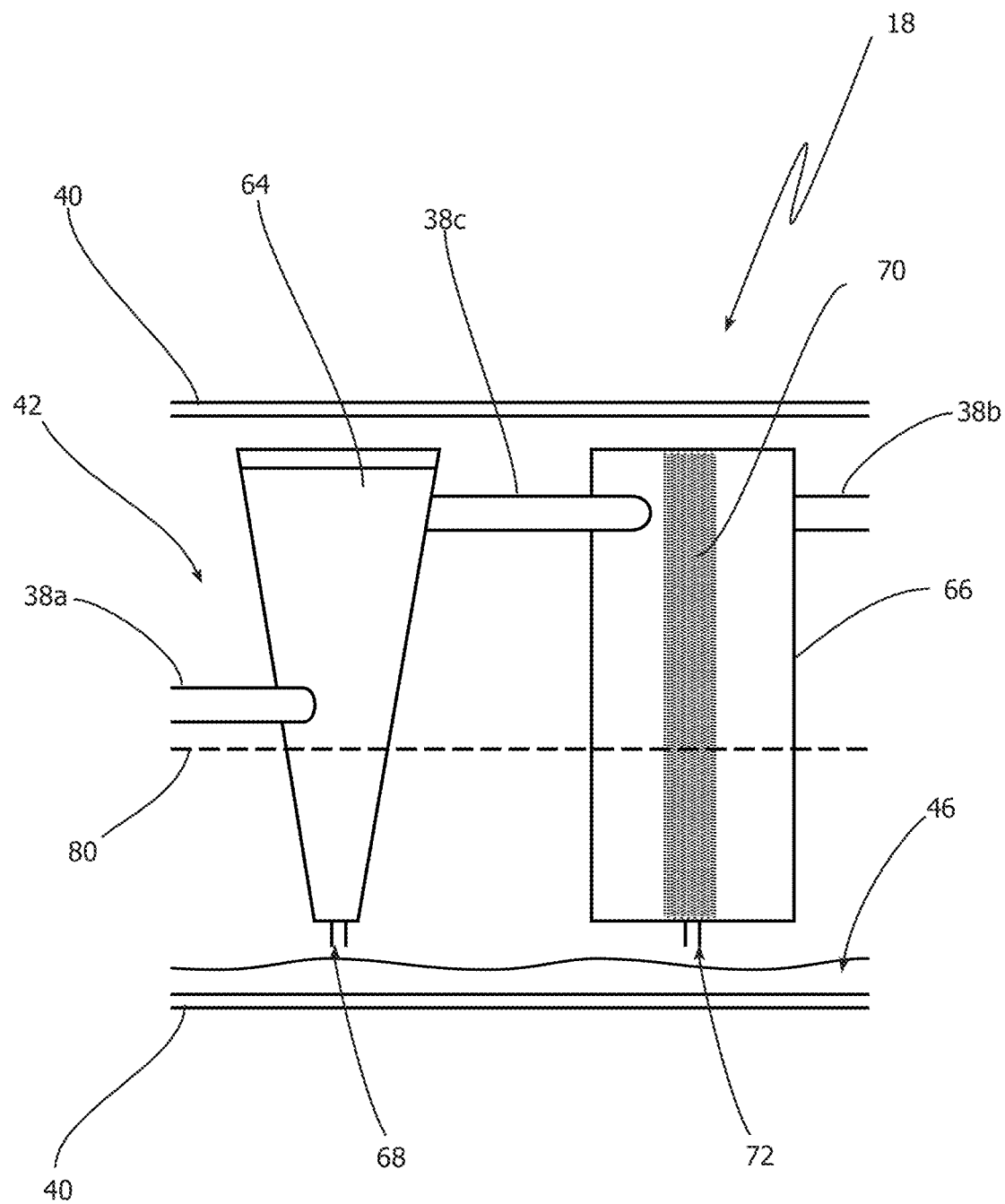
FIG. 3: is a schematic diagram of the separation stage of the system of FIG. 1.

The separation stage 18 of this particular example is illustrated schematically in FIG. 3. As shown in FIG. 3, the separation stage 18 includes a centrifugal-type separator 64, and a coalescing-type separator 66. A pipe 38c interconnects the centrifugal-type separator 64 and the coalescing-type separator 66, such that the processed fluid stream progresses to the coalescing-type separator 66 after discharge from the centrifugal-type separator 64.

As stated previously, the fluid stream containing at least compressed hydrogen gas and water is discharged via the compression stage discharge 36. It is understood that in at least some embodiments, the water component in the fluid stream that is discharged from the compression stage 16 will include liquid water in a range of particle sizes. A portion of that liquid water are "droplets", and another portion of that liquid are "aerosols". For the purposes of this specification, the term "aerosols" is to be understood to refer to liquid water of particle sizes that are capable of forming a microscopic suspension of liquid droplets within hydrogen gas flow. Further, the term "droplets" is to be understood to refer to liquid water of particle sizes that are larger than "aerosols". Without being bound to a specific size delineation, the particle size of aerosols is up to approximately 1,000 nanometres.

Within the separation stage 18, the centrifugal-type separator 64 operates to remove water in droplet form from the fluid stream, and the coalescing-type separator 66 operates to remove water in aerosol form from the fluid stream. Hence, the first portion of liquid water that is removed by the centrifugal-type separator 64 is in a form having a size that is larger than the droplet size of the second portion of liquid water (which is removed by the coalescing-type separator 66).

As shown in FIG. 1, the centrifugal-type separator 64 receives the fluid stream from the compression stage 16 via the pipe 38a. The centrifugal-type separator 64 has a conical chamber, and is shaped such that the flow path of the incoming fluid stream creates a vortex. The vortex action separates liquid water out of the fluid stream. To this end, the centrifugal force within the vortex causes the heavier liquid particles in the fluid stream to move radially outwardly and then downwardly within the conical chamber for discharge via a liquid discharge 68 of the centrifugal-type separator 64. The lighter weight particles in the fluid stream, which are predominantly gas molecules and aerosols, move radially inwardly and then upwardly to the process outlet. As previously stated, the outlet of the centrifugal-type separator 64 is connected to the pipe 38c such that the fluid stream progresses to the coalescing-type separator 66.

The coalescing-type separator 66 includes a screen element 70 through which the fluid stream is passed. Water aerosols in the fluid stream coalesce and/or are filtered by the screen element 70. To this end, liquid water within the fluid stream coalesces on the surface of the screen element 70. The gas fraction in the fluid stream passes through the screen element 70 and is discharged into the pipe 38b. Gravity draws the coalesced liquid water downward for discharge via a liquid discharge 72 of the coalescing-type separator 66.

The gas fraction that is discharged into the pipe 38c forms a gas stream that includes hydrogen gas and water vapour. That gas stream progresses to the drying stage 20 of the system 10.

As indicated in FIGS. 1 and 3, liquid water from the liquid discharge 68 of the centrifugal-type separator 64 and from the liquid discharge 72 of the coalescing-type separator 66 is discharged to accumulate in the sump 46 at the base of the encapsulating vessel 40.

Figure 4:
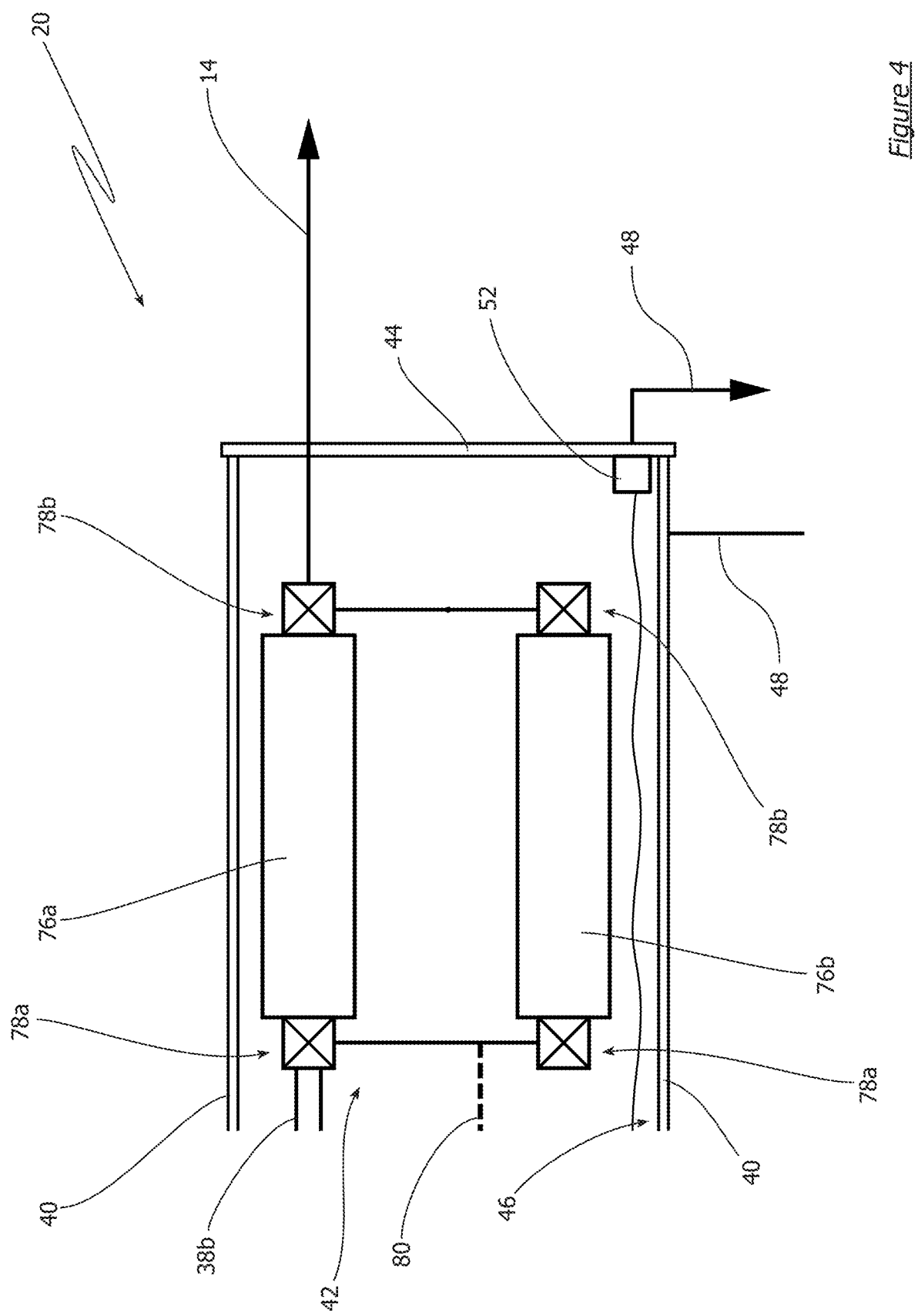
FIG. 4: is a schematic diagram of the drying stage of the system of FIG. 1.

The drying stage 20 is illustrated schematically in FIG. 4. As shown in FIG. 4, the drying stage 20 includes a gas dryer 74, which in this example is in the form of a pressure swing adsorption unit. The gas dryer 74 has dual chambers 76a, 76b, and sets of valves 78a, 78b that interconnect the gas dryer 74 with the pipe 38b and the primary gas outlet 14. Each chamber 76a, 76b contains a bed of desiccant material that is able to adsorb water vapour. As the gas stream passes through the desiccant material, water vapour is adsorbed into the desiccant, while the hydrogen gas continues through the respective chamber. Depending on the end use requirements for the compressed hydrogen gas, the gas dryer 74 can be arranged to remove water vapour in the hydrogen gas to a nominal pressure dewpoint that is in the range of 0° C. to −70° C.

Each of the chambers 76a, 76b has a generally elongate form. In this example, each chamber 76a, 76b is cylindrical. As indicated in FIG. 1, the system 10 is arranged with the longitudinal axes of the chambers 76a, 76b being substantially parallel with the rotational axis of the input shaft 32 of the rotary compressor 24. More particularly, the longitudinal axes of the chambers 76a, 76b are horizontal. This configuration simplifies the construction of the encapsulating vessel 40.

The sets of valves 78a, 78b are to be operated to control the flow of the gas stream through the chambers 76a, 76b, such that in operation of the system 10 each chamber is alternately "online" (and so is adsorbing water vapour from the gas stream into the desiccant material), and "offline" (and so to regenerate the desiccant material). As is known in this type of gas dryer, the two chambers are maintained in opposing states.

The gas dryer 74 regenerates the desiccant material in the offline chamber by diverting a portion of the dry compressed hydrogen gas that is discharged from the drying stage 20 to form a purge gas stream. Prior to passing through the offline chamber, the purge gas stream is expanded to be approximately at the pressure at the intake 22 of the rotary compressor 24. As is known to those having ordinary skill in the art, the expansion of the purge gas stream lowers the dew point of the purge gas stream, such that water in the desiccant material is taken up by the purge gas. The purge gas stream is returned to the low pressure side of the compression stage compression stage 16, as indicated in FIG. 1 by dashed arrow 80.

Operation of the valves in the sets of valves 78a, 78b is achieved by a pressurized gas control subsystem (not shown) that is part of the system 10. The gas control subsystem operates on the principles of pneumatic valve control, but does not use air for the control gas. In an example, the gas control subsystem can use hydrogen gas for the control gas. This has the advantage that any leaks from the gas control subsystem within the encapsulating vessel 40 only introduce hydrogen gas.

In some alternatives, the gas control subsystem can utilize a control gas that is at least substantially inert with respect to hydrogen, and/or has a sufficiently high ionisation energy such that within the system and process operating parameters a reaction between the control gas and hydrogen is unlikely. Examples of such control gases include argon gas, and nitrogen.

In the example illustrated in FIG. 1, the separation stage 18 is shown with the centrifugal-type separator 64 and coalescing-type separator 66 as separate components. It should be appreciated that in some alternatives, the separation stage 18 can have a dual action separator that provides for sequential centrifugal separation and coalescing separation of the fluid stream.

Figure 5:
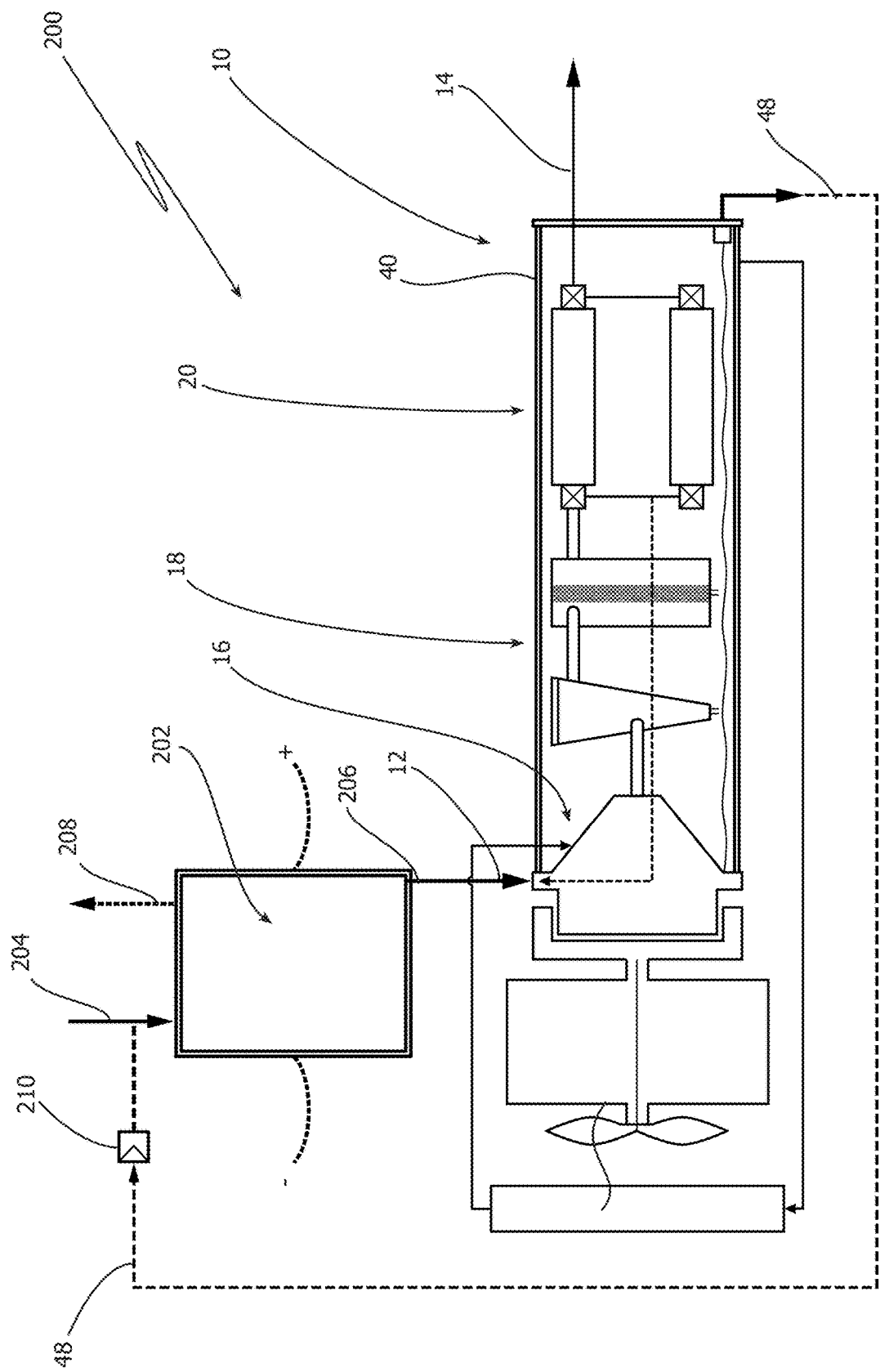
FIG. 5: is a schematic diagram of a hydrogen production facility according to an embodiment, the facility including the system of FIG. 1.

FIG. 5 a schematic piping and instrumentation diagram of hydrogen gas production facility 200. The facility 200 includes an electrolyser 202 for electrolysing hydrogen gas from water, and the system 10 for compressing hydrogen gas as described previously and in reference to FIGS. 1 to 4.

It should be appreciated that the form and components of the electrolyser 202 has relevance to the compression and drying of the produced hydrogen gas. However, for the purposes of this disclosure, it is sufficient to note that the electrolyser 202 has a water inlet 204, a hydrogen gas outlet 206, and an off gas discharge 208. The electrolyser 202 receives liquid water via the water inlet 204 from an appropriate supply, and separates out hydrogen gas by an electrolysis process. To this end, an electrical current is applied to the liquid water to separate the water molecules into hydrogen gas and oxygen gas. The off gases, including oxygen gas, is passed through the off gas discharge 208 for appropriate management.

The hydrogen gas outlet 206 supplies hydrogen gas to the primary gas inlet 12 of the system 10.

The water return circuit 48 returns liquid water from the sump 46, released via the overflow valve 52, to merge with the liquid water at the water inlet 204. A check valve 210 can be installed in the water return circuit 48 to ensure appropriate direction of flow.

It should be appreciated that the hydrogen gas that is produced by the electrolyser 202 can contain a water vapour fraction, due to the nature of the electrolysis process. Consequently, the hydrogen gas production facility 200 has a net positive flow of water vapour into the system 10. Water that is extracted by the system 10, as previously described, is returned for reprocessing by the electrolyser 202 and then the system 10.

It may be necessary to implement a start-up procedure for the hydrogen gas production facility 200 that may involve charging the encapsulating vessel 40 with liquid water to fill the sump 46. It may also be necessary to charge the encapsulating vessel 40 with hydrogen gas and pressurize the cavity 42 to the operating pressure of the compression stage 16 at the compression stage discharge 36.

Figure 6:
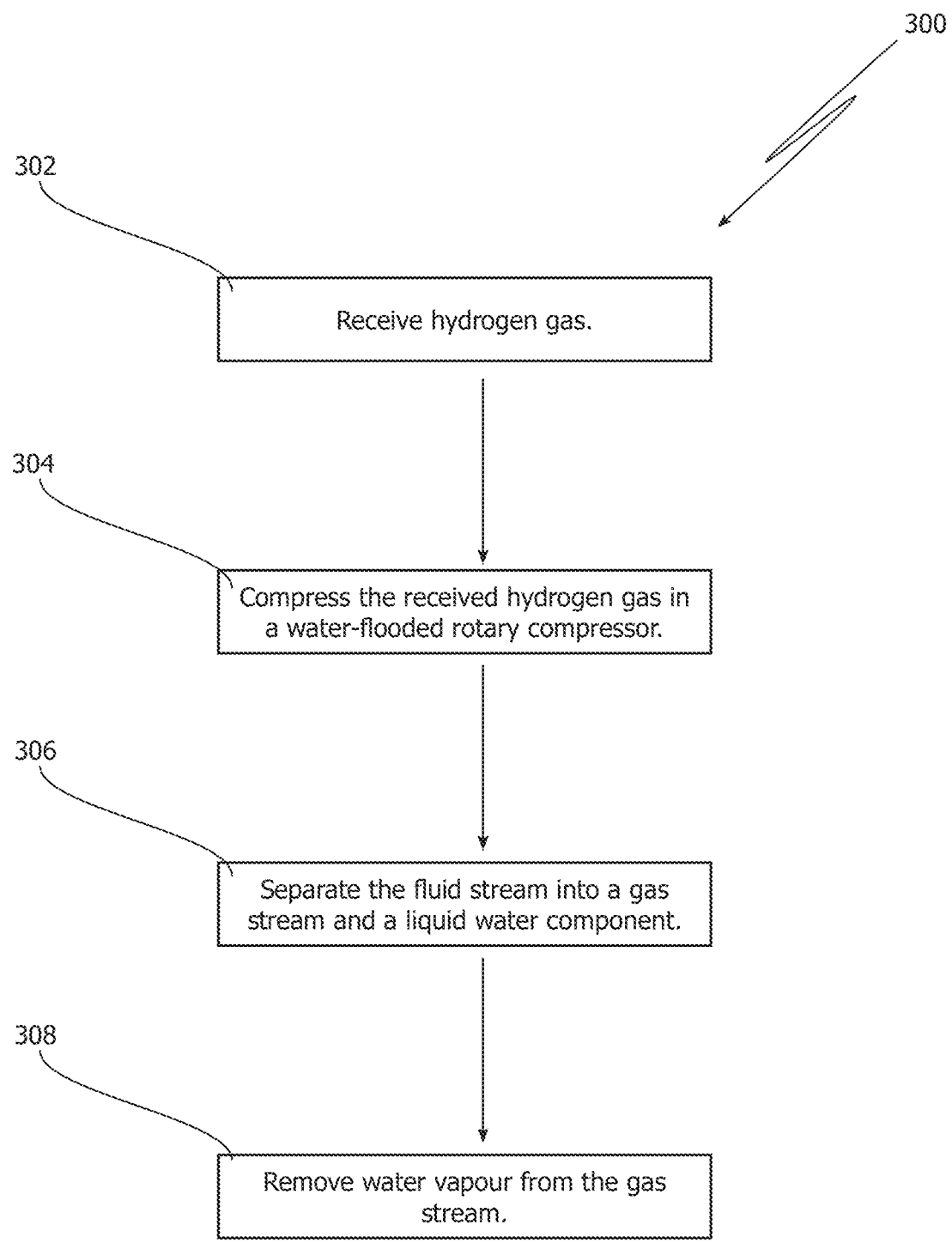
FIG. 6: is a flow chart of a method of compressing hydrogen gas according to an embodiment.

FIG. 6 is a flow chart showing a method 300 of compressing hydrogen gas. The method involves:
Step 302—receiving hydrogen gas.
Step 304—compressing the received hydrogen gas in a water-flooded rotary compressor. The rotary compressor discharges a fluid stream containing compressed hydrogen gas and water.
Step 306—separating the fluid stream into a gas stream and a liquid water component.
Step 308—removing water vapour from the gas stream.

A dry compressed hydrogen gas remains after water vapour is removed at step 308. It should be appreciated that the system 10 implements the method 300.

Liquid water and water vapour that are removed in steps 306 and 308 respectively can then be directed for reprocessing, as described previously with respect to the system 10 and in reference to FIGS. 1 and 2.

Figure 7:
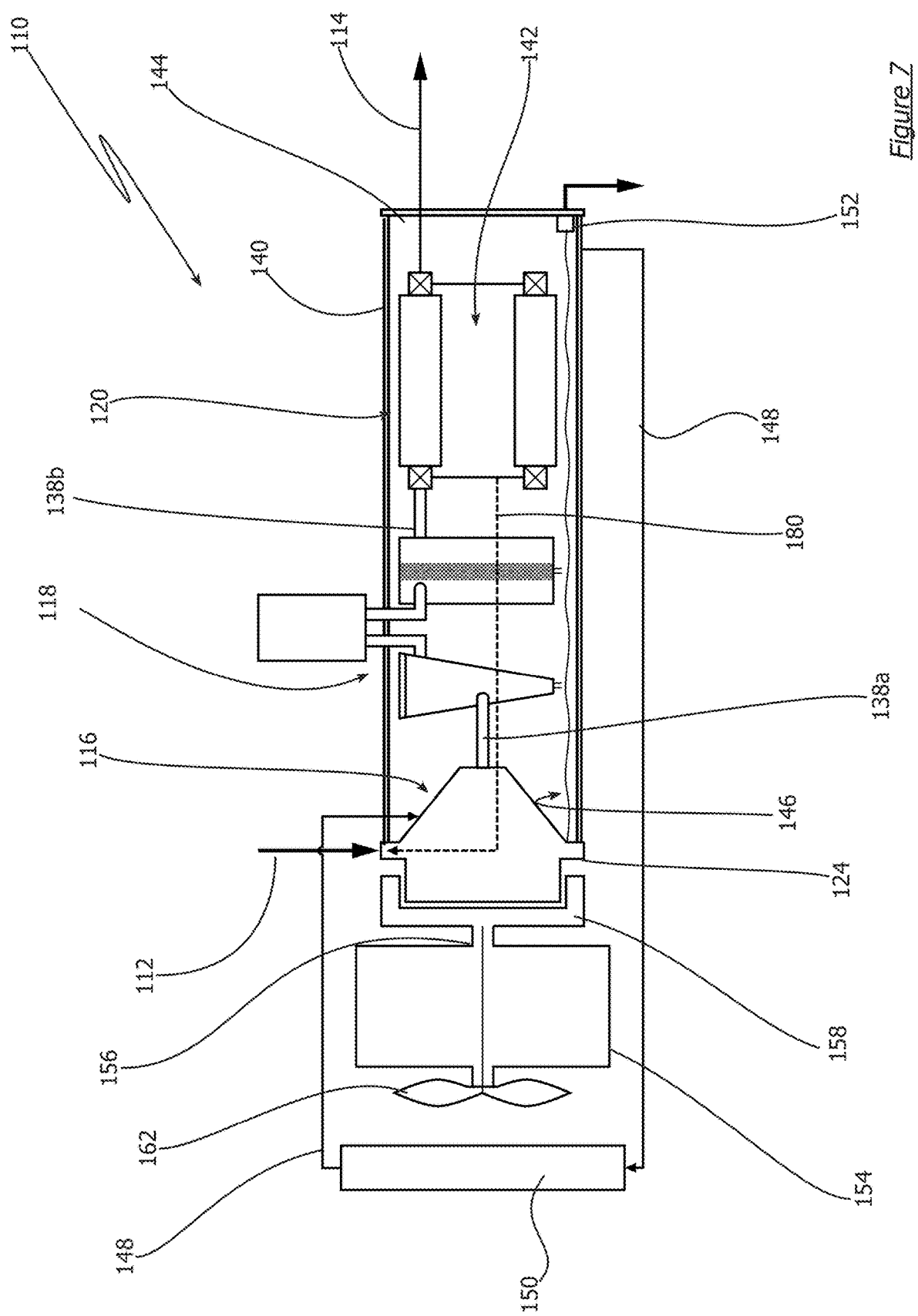
FIG. 7: is a piping and instrumentation diagram of a system for compressing hydrogen gas according to an embodiment.
Figure 8:
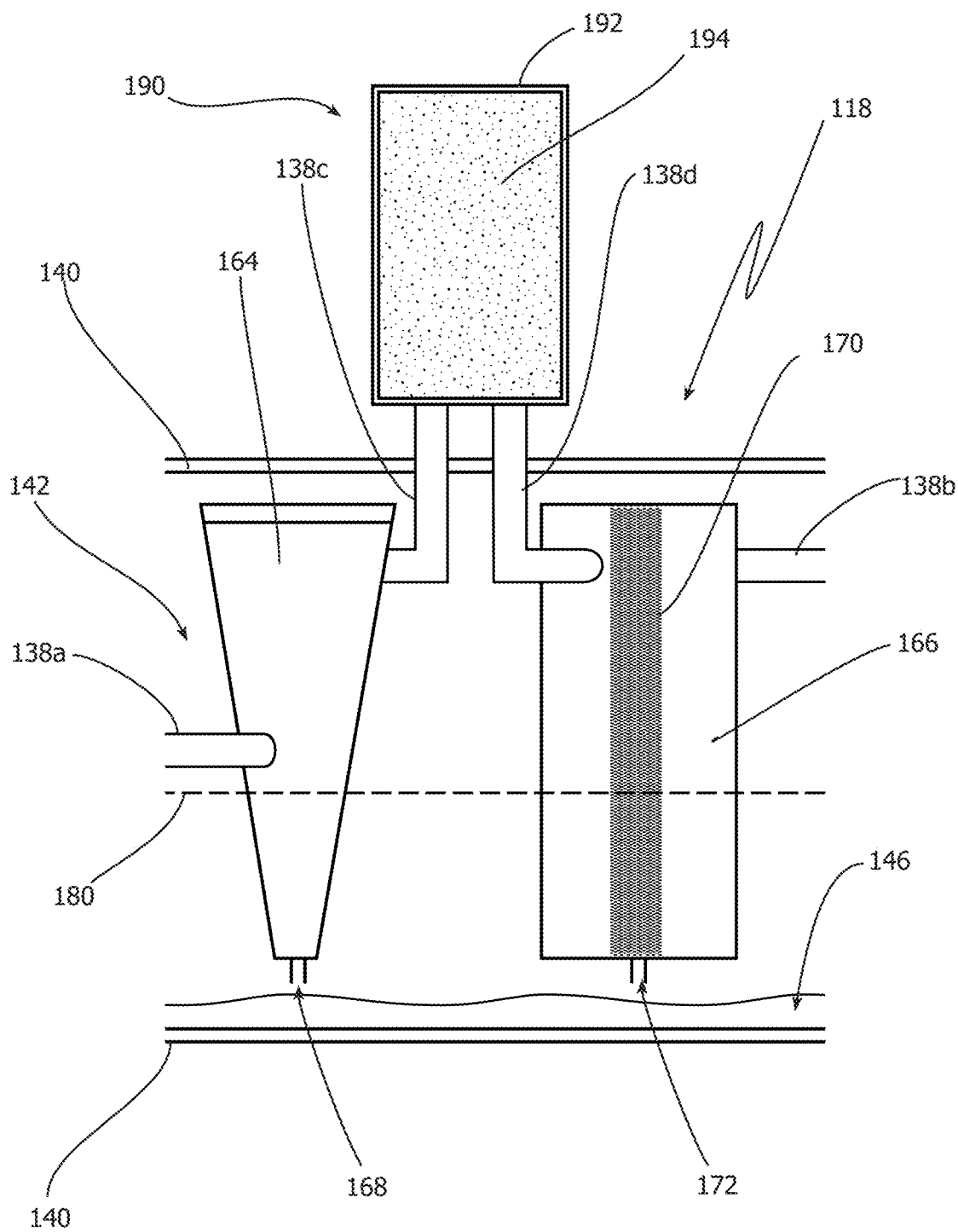
FIG. 8: is a schematic diagram of the separation and deoxidation stages of the system of FIG. 7.

FIGS. 7 and 8 show a piping and instrumentation diagram of a system 110 for compressing hydrogen gas according to another embodiment. Parts of the system 110 that are the same or similar to parts of the system 10 have the same reference numbers with the prefix "1" and for succinctness, will not be described again.

The system 110 includes a deoxidation stage 190 that is arranged to remove oxygen from the fluid stream. As shown in FIG. 8, the deoxidation stage 190 receives the fluid stream after exiting the centrifugal-type separator 164, and prior to entering the coalescing-type separator 166. The deoxidation stage 190 includes a deoxidation vessel 192 having a chamber, and a catalyst 194 within the chamber. The catalyst 194 is selected to remove oxygen molecules from the fluid stream as it passes through the chamber of the deoxidation vessel 192.

A pipe 138c interconnects the centrifugal-type separator 164 with the deoxidation vessel 192, and another pipe 138d interconnects the deoxidation vessel 192 with the coalescing-type separator 166.

As should be apparent from FIGS. 7 and 8, the pipes 138c, 138d pass through the wall of the encapsulating vessel 140, and the deoxidation vessel 192 is external of the encapsulating vessel 140. It should be appreciated that certain deoxidation processes have a significant heat output. Accordingly, it is advantageous for the system 110 that the deoxidation processes occur substantially external to the cavity 142.

Figure 9:
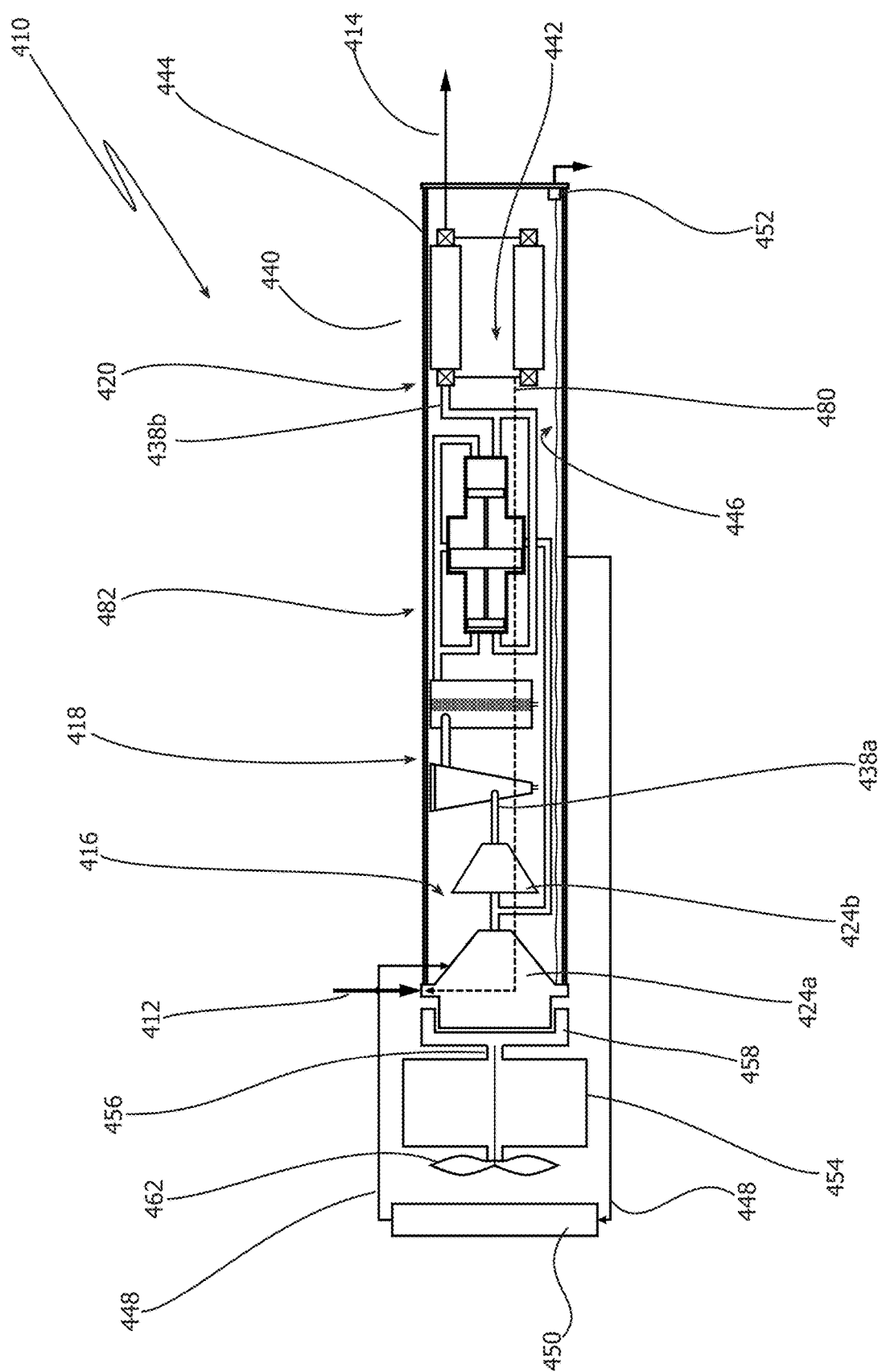
FIG. 9: is a piping and instrumentation diagram of a system for compressing hydrogen gas according to another embodiment.
Figure 10:
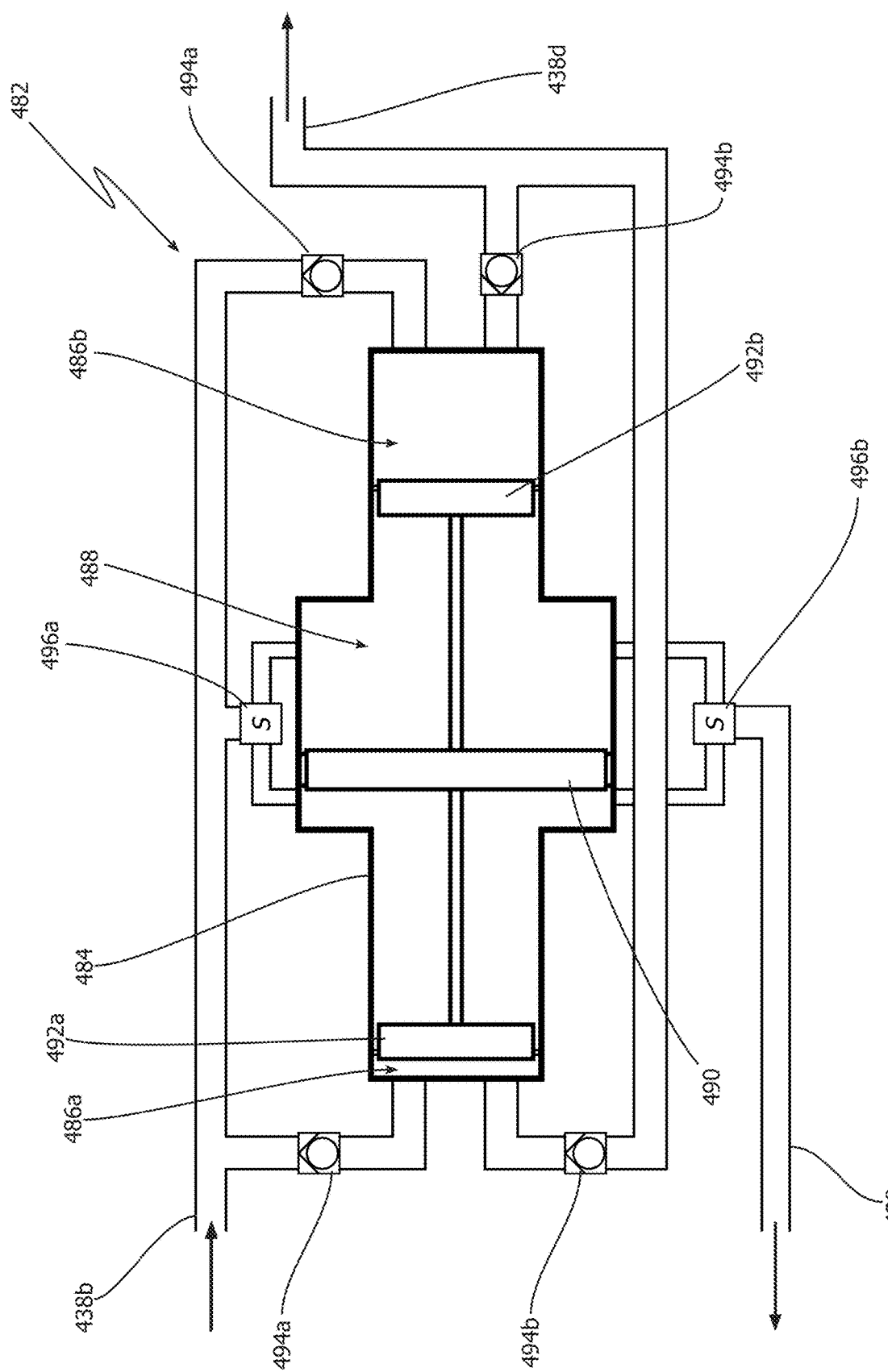
FIG. 10: is a schematic diagram of a pressure boost stage of the system of FIG. 9.

FIGS. 9 and 10 show a piping and instrumentation diagram of a system 410 for compressing hydrogen gas according to another embodiment. Parts of the system 410 that are the same or similar to parts of the system 10 described above have the same reference numbers with the prefix "4" and for succinctness, will not be described again.

The compression stage 416 of the system 410 provides for multi-stage compression. In this example, two rotary compressors 424a, 424b sequentially compress the gas received from the primary gas inlet 412 at the intake 422 to the first stage rotary compressor 424a. The first stage rotary compressor 424a compresses gas to a first nominal pressure, and the second stage rotary compressor 424b compresses gas to a second nominal pressure. By way of indicative example only, the first nominal pressure can be in the range of 0.8 to 1.6 MPa (8 to 16 bar), and the second nominal pressure can be in the range of 3 to 6 MPa (30 to 60 bar).

The system 410 includes a pressure boost stage 482 that is between the separation and drying stages 418, 420. It should be appreciated that the pressure boost stage 482 acts to increase the pressure of the gas stream prior to passing into the drying stage 420.

The pressure boost stage 482 is illustrated schematically in further detail in FIG. 10. The pressure boost stage 482 includes a gas driven pressure booster 484, that is interconnected with the separation stage 418 by pipe 438*b*, and with the drying stage 420 by pipe 438*d*. A gas driven pressure booster is known in the art; the description that follows is provided merely for context, and is not intended to be a complete description. In the illustrated example, the gas driven pressure booster 484 is a single stage, double acting pressure booster. In some alternatives, the gas driven pressure booster 484 can be a dual stage pressure booster, or a single stage, single acting pressure booster.

The gas driven pressure booster 484 has a pair of compression chambers 486*a*, 486*b* between which is a central drive chamber 488. Within the central drive chamber 488 is a master piston 490. Each compression chamber 486*a*, 486*b* has a primary piston 492*a*, 492*b* that is connected with the master piston 490 by a rod.

The gas driven pressure booster 484 also includes an induction manifold, a high-pressure discharge manifold, and an exhaust return manifold. It should be appreciated that the induction manifold, high-pressure manifold, and an exhaust return are shown schematically in FIG. 10.

The induction manifold is to direct gas from the pipe 438*b* to intake ports of each of the compression chambers 486*a*, 486*b* via check valves 494*a*, and to the central drive chamber 488 via a spool valve 496*a*. It should be appreciated that in operation of the system 410 the induction manifold receives hydrogen gas via the pipe 438*b* at approximately the second nominal pressure.

The high-pressure manifold receives gas from exhaust ports of each of the compression chambers 486*a*, 486*b*, and directs the gas to the pipe 438*d* via check valves 494*b*.

The exhaust return receives exhaust gas from the central drive chamber 488, through spool valve 496*b*, and is then arranged to return the exhaust gas through a return pipe 438*r* to merge with the fluid stream. In this example, the exhaust return merges the exhaust gas between the first and second stage rotary compressors 424*a*, 424*b*, as shown in FIG. 9. It should be appreciated that in operation of the system 410, the pressure within the induction manifold is higher than the pressure within the exhaust gas return manifold.

By way of brief explanation, the spool valves 496*a*, 496*b* are configured to alternately define a pressure differential within the central drive chamber 488 and across the master piston 490. Accordingly, the master piston 490 reciprocates within the central drive chamber 488. A charge of gas is drawn into each compression chamber 486*a*, 486*b* from the induction manifold as the working volume in the corresponding compression chamber 486*a*, 486*b* is increasing. Within the opposing compression chamber 486*b*, 486*a*, gas is compressed to a third nominal pressure as the working volume decreases. The check valves 494*b* open to release the compressed gas stream into the pipe 438*d* at the third nominal pressure.

As is known to those having ordinary skill in the art, the ratio between the area of the master piston 490 and the primary pistons 492 is proportional to the maximum compression ratio of the gas driven pressure booster 484.

In the illustrated example, the pressure boost stage 482 is positioned between the separation and drying stages 418, 420. This is beneficial in that the gas stream is to be free of liquid water. Hence, the operation of the gas driven pressure booster 484 is unlikely to be compromised by the presence of liquid in the gas stream. Some alternative examples may have a pressure boost stage that receives dried compressed hydrogen gas from the drying stage (and hence is positioned between the drying stage and the primary gas outlet).

In one example, the maximum compression ratio of the gas driven pressure booster 484 is at least 2:1. Accordingly, the third nominal pressure at the pipe 438*d* can be in excess of 6 MPa. In another example, the maximum compression ratio of the gas driven pressure booster 484 is 2.5:1, such that system 410 operates with the third nominal pressure at the pipe 438*d* being in the range of approximately 7.5 to 15 MPa.

It should be appreciated that the pressure of the compressed hydrogen gas at the primary gas outlet 414 of the system 410 can be further increased by including additional compression stages within the compression stage 416.

Throughout this specification and the claims which follow, unless the context requires otherwise, the word "comprise", and variations such as "comprises" and "comprising", should be understood to imply the inclusion of a stated integer or step or group of integers or steps but not the exclusion of any other integer or step or group of integers or steps.

The reference in this specification to any prior publication (or information derived from it), or to any matter which is known, is not, and should not be taken as an acknowledgment or admission or any form of suggestion that that prior publication (or information derived from it) or known matter forms part of the common general knowledge in the field of endeavour to which this specification relates.

The invention claimed is:

1. A hydrogen gas compression system comprising:
   a primary gas inlet through which to receive hydrogen gas;
   a compression stage having:
      an intake that receives gas from the primary gas inlet,
      at least one rotary compressor that has:
         a working chamber,
         one or more rotating elements housed internally of the working chamber that are driven via an input shaft to compress gas passing through the working chamber, and
         a liquid water inlet through which liquid water is delivered into the working chamber to provide lubrication to the rotating elements, and sealing of the working chamber, and
      a compression stage discharge that is in communication with the working chamber, through which to discharge a fluid stream containing at least compressed hydrogen gas and water;
   a separation stage that is in communication with the compression stage discharge and includes at least one separator that is configured to separate a liquid component from the fluid stream and thereby discharge a gas stream;
   a drying stage that is in communication with the separation stage and includes at least one adsorption-type gas dryer that is configured to adsorb and thereby remove water vapour from the gas stream;
   a primary gas outlet that is in communication with the drying stage, and through which to discharge dry compressed hydrogen gas; and
   an encapsulating vessel defining a cavity within which the separation stage and drying stage are located, the encapsulating vessel having a port in communication with the primary gas outlet.

2. The hydrogen gas compression system of claim 1, wherein at least the compression stage discharge of the compression stage is located within the cavity.

3. The hydrogen gas compression system of claim 1, wherein the encapsulating vessel is substantially hermetically sealed so that the cavity is isolated from the atmosphere.

4. The hydrogen gas compression system of claim 1, wherein the at least one rotary compressor includes a housing, and the vessel is configured to mate with the housing, and
wherein the cavity is defined by the housing and the vessel.

5. The hydrogen gas compression system of claim 1, wherein the encapsulating vessel is configured to form a sump within which to collect the liquid component separated from the fluid stream in the separation stage, and
the system further comprises a water return circuit that receives liquid water collected in the sump, and supplies the liquid water to the liquid water inlet of the compression stage.

6. The hydrogen gas compression system of claim 1, wherein the one or more rotating elements of the rotary compressor can be any of: a vane, a screw, a complementary twin screw pair, or a scroll.

7. The hydrogen gas compression system of claim 1, wherein the compression stage includes two or more rotary compressors that are assembled for sequential compression of hydrogen gas.

8. The hydrogen gas compression system of claim 1, further comprising a drive motor having an output shaft, and a non-contact coupling mounted between the drive motor output shaft and the input shaft.

9. The hydrogen gas compression system of claim 1, wherein the gas dryer contains desiccant material to adsorb water vapour from the gas stream.

10. The hydrogen gas compression system of claim 1, wherein the gas dryer is a pressure swing adsorption unit that has dual chambers each containing a bed of desiccant material, and valves to control the flow of the gas stream through the chambers such that in operation of the system each chamber alternately adsorbs water vapour from the gas stream into the desiccant material, and regenerates the desiccant material.

11. The hydrogen gas compression system of claim 10, wherein each of the chambers is a generally elongate chamber, and wherein the system is arranged with the longitudinal axes of the chambers being substantially parallel with the rotational axis of the input shaft.

12. The hydrogen gas compression system of claim 10, wherein the gas dryer is configured to regenerate the desiccant material by diverting a portion of the dry compressed hydrogen gas that is discharged from the drying stage to form a purge gas stream, and
wherein the purge gas stream of the pressure swing adsorption unit is expanded to be approximately at the pressure at the intake, and then passed through the desiccant material to be regenerated.

13. The hydrogen gas compression system of claim 12, wherein the purge gas stream of the pressure swing adsorption unit is returned to the intake of the compression stage after passing through the desiccant material to be regenerated.

14. The hydrogen gas compression system of claim 1, wherein the separation stage includes a first separator that removes a first portion of liquid water from the fluid stream, and a second separator that removes a second portion of liquid water from the fluid stream, and
wherein the first portion of liquid water is in a form having a size that is larger than a droplet size of the second portion of liquid water.

15. The hydrogen gas compression system of claim 1, wherein the separation stage includes a centrifugal-type separator that induces a vortex in the incoming fluid stream, and wherein centrifugal force within the vortex at least substantially separates at least a first portion of liquid water out of the fluid stream.

16. The hydrogen gas compression system of claim 1, wherein the separation stage includes a coalescing-type separator with at least one screen element through which to pass the fluid stream, whereby liquid water within the fluid stream coalesces on the surface of the screen element to thereby separate the fluid stream into coalesced liquid water and the gas stream, and
wherein the coalesced liquid water forms a part of the liquid component that is separated from the fluid stream.

17. The hydrogen gas compression system of claim 1, further comprising a pressure boost stage that acts on one of the gas stream or the fluid stream,
wherein the pressure boost stage includes a gas driven pressure booster that is configured to increase the pressure of the gas stream or the fluid stream passing therethrough.

18. The hydrogen gas compression system of claim 17, wherein exhausted drive gas is directed to a lower pressure point within the system, the lower pressure point being between the primary gas inlet and the pressure boost stage.

19. The system of claim 17, wherein the gas driven pressure booster is a dual action single stage booster.

20. The hydrogen gas compression system of claim 1, further comprising a deoxidation stage that is arranged to remove oxygen from the fluid stream, the deoxidation stage including a deoxidation vessel having a chamber and a catalyst within the chamber, wherein the catalyst is to remove oxygen molecules from the fluid stream.

* * * * *